United States Patent
Muston et al.

[11] 3,894,431
[45] July 15, 1975

[54] APPARATUS FOR INDICATING FLUID FLOW VELOCITY

[75] Inventors: Albert Henry Muston, Newbury; William Ronald Loosemore, Abingdon, both of England

[73] Assignee: United Kingdom Atomic Energy Authority, London, England

[22] Filed: Feb. 6, 1974

[21] Appl. No.: 440,163

Related U.S. Application Data
[63] Continuation-in-part of Ser. No. 347,642, April 4, 1973, abandoned.

[30] Foreign Application Priority Data
Apr. 4, 1972  United Kingdom............... 15554/72

[52] U.S. Cl.............................................. 73/194 A
[51] Int. Cl.². ......................................... G01F 1/66
[58] Field of Search .................................. 73/194 A

[56] References Cited
UNITED STATES PATENTS

| | | | |
|---|---|---|---|
| 3,420,102 | 1/1969 | Brown................................. | 73/194 A |
| 3,625,057 | 12/1971 | Yoshiyana et al. ................ | 73/194 A |
| 3,720,105 | 3/1973 | Cirulis................................ | 73/194 A |
| 3,738,169 | 6/1973 | Courty............................... | 73/194 A |
| 3,751,979 | 8/1973 | Ims .................................... | 73/194 A |
| 3,780,577 | 12/1973 | Brown................................ | 73/194 A |
| 3,818,757 | 6/1974 | Brown................................ | 73/194 A |

Primary Examiner—Charles A. Ruehl
Attorney, Agent, or Firm—Larson, Taylor & Hinds

[57] ABSTRACT

Fluid flow rate is determined by transmitting ultrasonic pulses in both directions along a path through the fluid aligned with the direction in which velocity component is to be measured. Transmission of, and measurement upon, pulses in the two directions are controlled by a master clock pulse generator. The frequency of a first variable frequency oscillator is adjusted to fit N pulses exactly into the timer period for flight of an ultrasonic pulse along the path in one direction. The frequency of a second variable frequency oscillator is adjusted to fit N pulses exactly into the time period for flight of an ultrasonic pulse along the path in the opposite direction. The difference frequency is proportional to velocity component. This system may be combined with a limited sing-around system to improve resolution, at the expense of the time response.

29 Claims, 12 Drawing Figures

APPARATUS FOR INDICATING FLUID FLOW VELOCITY

This application is a continuation-in-part of our earlier application Ser. No. 347,642, filed Apr. 4, 1973, now abandoned.

The invention relates to apparatus for indicating fluid flow velocity by comparsion of times of flight of pressure wave pulses transmitted in opposite directions along a predetermined path in the fluid.

The invention provides apparatus for use in measuring the velocity or a component of velocity of fluid flow, which apparatus comprises a first and second units spaced apart and each adapted to transmit and receive pressure wave pulses travelling over a path through the fluid in the direction in which velocity component is to be measured, a clock pulse generator, the frequency of which is fixed for a given set of measurement conditions, variable frequency oscillator means, means under control of the said clock pulse generator for causing a pressure wave pulse to be transmitted from the first unit to the second unit and, separately, from the second unit to the first unit, and control means for adjusting the variable frequency oscillator means to generate a first frequency dependent upon the time taken for a pressure wave pulse to travel from the first unit to the second unit and, separately under control of said clock pulse generator, to generate a second frequency dependent upon the time taken for a pressure wave pulse to travel from the second unit to the first unit, and a comparator for comparing the said first and second frequencies.

Preferably the variable frequency oscillator means is controlled by the said control means to generate a number $N_1$ of oscillations or pulses in a first time period being that taken for a pressure wave pulse to travel from the first unit to the second unit and a number $N_2$ of oscillations or pulses in a second time period being that taken for a pressure wave pulse to travel from the second unit to the first unit, said control means comprising logic circuitry for comparing the times of occurrence of the $N_1$th oscillation or pulse with the time of arrival of the pressure wave pulse at the second unit and for comparing the time of occurrence of the $N_2$th oscillation or pulse and the time of arrival of the pressure wave pulse at the first unit, and means for adjusting the oscillation or pulse repetition frequency to tend to bring the said times of occurrence of the $N_1$th or $N_2$th oscillation or pulse into coincidence with the time of arrival of the respective pressure wave pulse, the said comparator indicating the difference in frequency between the oscillations or pulses generated in the first time period and the oscillations or pulses generated in the second time period.

Preferably inhibitor means are provided for inhibiting adjustment of the oscillation or pulse repetition frequency in the event that no pressure wave pulse is received within a predetermined period embracing its expected time of arrival.

Preferably $N_1 = N_2 = N$.

In one arrangement according to the invention first trigger means is provided for re-triggering the first unit upon reception of a pulse by the second unit, said first trigger means being controlled to inhibit further re-triggering when a predetermined number $M_1$ of pulses has been transmitted from the first unit to the second unit, second trigger means is provided for re-triggering the second unit upon reception of a pulse by the first unit, said second trigger means being controlled to inhibit further re-triggering when a predetermined number $M_2$ of pulses has been transmitted from the second unit to the first unit, the clock pulse generator being set to initiate pulse transmission from the second unit to the first unit only after sufficient time has elasped for completion of $M_1$ "sing around" transmissions from the first unit to the second unit and to initiate pulse transmission from the first unit to the second unit only after sufficient time has elapsed for completion of $M_2$ "sing around" transmissions from the second unit to the first unit, and the variable frequency oscillator means is controlled to generate a first frequency dependent upon the time taken for $M_1$ sing around transmissions of pressure wave pulses from the first unit to the second unit and a second frequency dependent upon the time taken for $M_2$ sing around transmissions of pressure wave pulses from the second unit to the first unit.

Preferably $M_1 = M_2 = M$.

The invention also provides apparatus for use in measuring the velocity or a component of velocity of fluid flow, which apparatus comprises first and second units spaced apart and each adapted to transmit and receive pressure wave pulses travelling over a path through the fluid in the direction in which velocity component is to be measured, a clock pulse generator, the frequency of which is fixed for a given set of measurement conditions, first and second variable frequency oscillators, means under control of the said clock pulse generator for causing a pressure wave pulse to be transmitted from the first unit to the second unit and, separately, from the second unit to the first unit, first control means for controlling the frequency of the first variable frequency oscillator to generate a first frequency dependent upon the time taken for a pressure wave pulse to travel from the first unit to the second unit, second control means for controlling the frequency of second variable frequency oscillator to generate a second frequency dependent upon the time taken for a pressure wave pulse to travel from the second unit to the first unit, the first and second control means being controlled for operation in sequence by the clock pulse generator, and a comparator for comparing the said first and second frequencies.

Preferably the first variable frequency oscillator is controlled by the first control means to generate a number $N_1$ of oscillations or pulses in a first time period being that taken for a pressure wave pulse to travel from the first unit to the second unit, the second variable frequency oscillator is controlled by the second control means to generate a number $N_2$ of oscillations or pulses in a second time period being that taken for a pressure wave pulse to travel from the second unit to the first unit, the said first and second control means each comprising logic circuitry for comparing the times of occurrence of the respective $N_1$th or $N_2$th oscillation or pulse with the time of arrival of the pressure wave pulse at the second unit or first unit respectively and frequency control means for adjusting the frequency of the respective variable frequency oscillator to tend to bring said time of occurrence of the respective $N_1$th or $N_2$th pulse into coincidence with the time of arrival of the pressure wave pulse at the second unit or first unit respectively, the said comparator indicating the difference in frequency between the oscillations or pulses generated in the first time period and the oscillations or pulses generated in the second time period.

Preferably inhibitor means are provided for inhibiting adjustment of the oscillation or pulse repetition frequency in the event that no pressure wave pulse is received within a predetermined period embracing its expected time of arrival.

Again its preferred that $N_1 = N_2 = N$.

Preferably the said frequency control means comprises a first device operative when switched to increase the frequency of the associated variable oscillator and a second device operative when switched to decrease the frequency of the associated variable frequency oscillator.

The logic circuitry provides an output for switching the said first device when the time of arrival of the pressure wave pulse is in advance of the time of occurrence of the respective $N_1$th or $N_2$th oscillation or pulse, the logic circuitry provides an output for switching the said second device when the time of occurrence of the respective $N_1$th or $N_2$th oscillation is in advance of the time of arrival of the pressure wave pulse and a said pressure wave pulse arrives within a time period embracing its expected time of arrival, and the logic circuitry provides no output if no pressure wave pulse arrives within the said time period embracing its expected time of arrival.

Preferably the said first device when switched increases the frequency of the associated variable frequency oscillator by a fixed increment and the said second device when switched decreases the frequency of the associated variable frequency oscillator by a fixed increment.

Thus it may take several time periods before coincidence between occurrence of an event and completion of N oscillations or pulses is approached. It will be appreciated that the apparatus thus tends to average out small variations in the time periods between successive events and cannot follow rapid wide variations in the time period.

With this arrangement, if there is a wide divergence upon initial setting up, it may take an unacceptably long time for coincidence to be approached. To alleviate this difficulty, means may be provided for adjusting temporarily the magnitude of the frequency change with each operation of the frequency control means. When coincidence is approached, the apparatus is returned to its normal setting designed to give the desired resolution.

Specific constructions of apparatus embodying the invention will now be described by way of example and with reference to the accompanying drawings, in which:

FIG. 9 (a) to (f) shows further waveforms of electrical signal pulses;

Figure 10:
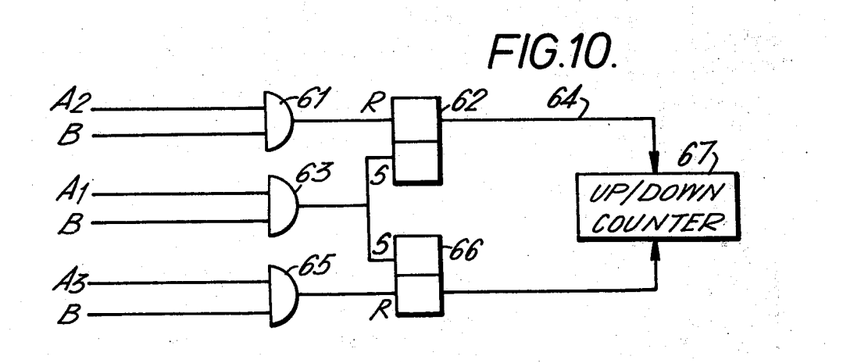
FIG. 10 is a block diagram of a further part of the construction shown in FIG. 7.

Operation of the part shown in FIG. 10. British Patent Specification No. 1,285,175 describes a flowmeter which has an output frequency proportional to fluid velocity. This output frequency is the difference frequency fd of "upstream" and "downstream" sing-around pulse trains. By "sing-around" pulse trains is meant pulse trains generated by re-triggering the transmitter when a pulse is received by the receiver.

The frequency of the "upstream" pulse train $$f_1 = \frac{1}{t_1} = \frac{C-V}{L}$$

The frequency of the "downstream" pulse train $$f_2 = \frac{1}{t_2} = \frac{C+V}{L}$$

where
V = Velocity of the fluid
C = Velocity of sound in the fluid
L = Distance between the transducers
$t_1$ = upstream time of flight — that is time of transit of pulses from the transmitter to the receiver
$t_2$ = downstream time of flight
from which $$f_2 = f_1 - f_2 = \frac{2V}{L}$$

The readout time for such a flowmeter is the time required to meadure $f_d$ to the required accuracy. The long times required for this readout for low flow rates can be a disadvantage in some applications.

The constructions of apparatus embodying the present invention provide improved flowmeters using multiplying variable frequency oscillators whereby a much faster readout can be achieved. Provision is made for accommodating temporary obstruction of the ultrasonic pulse path. The flowmeter is thus unaffected when used for measurement of flow rate of liquids containing, for example, solid bodies.

Figure 1:
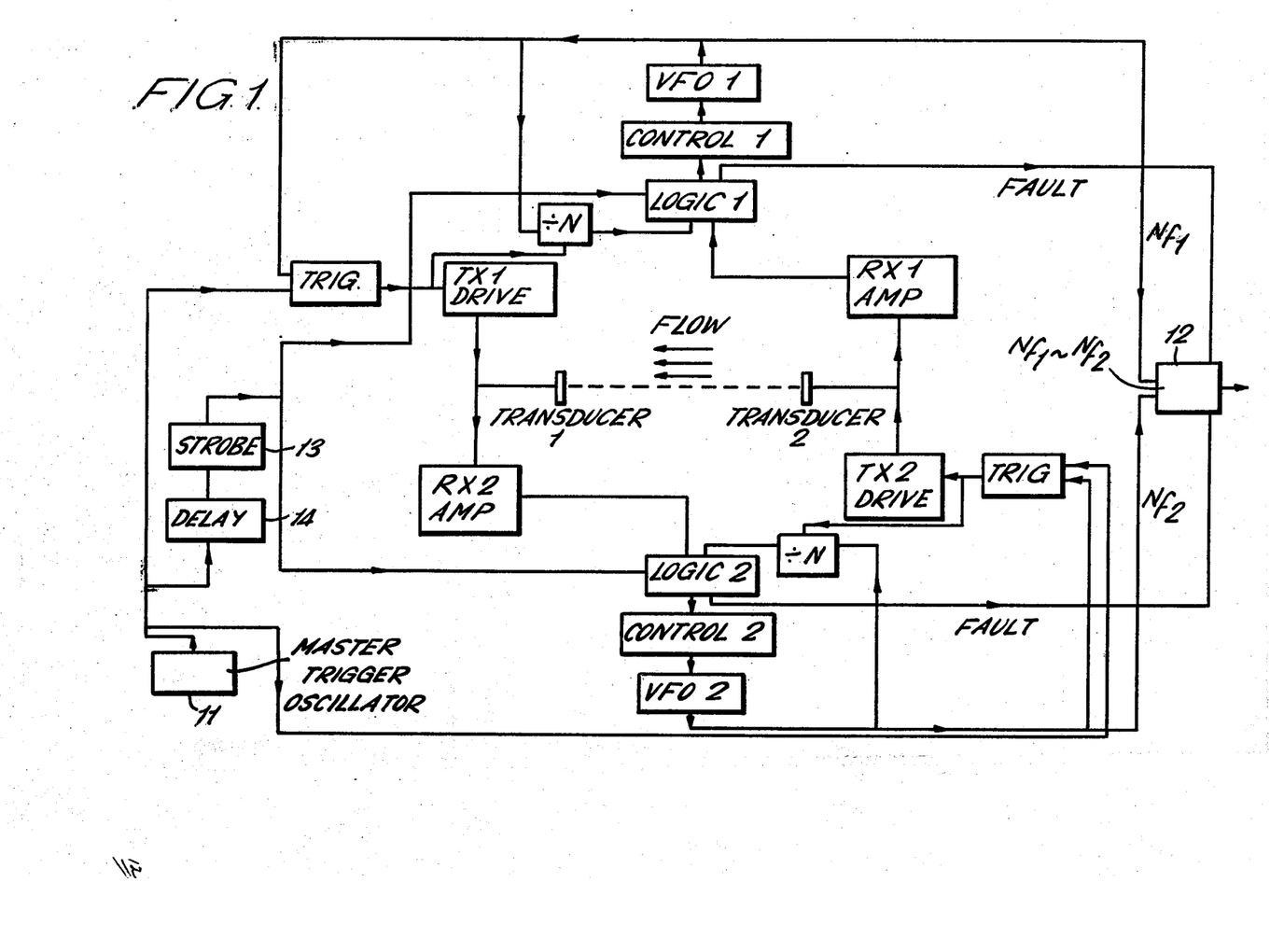
FIG. 1 is a block diagram illustrating one construction.

Referring to FIG. 1, the essential components of a flowmeter are shown.

The output of this flowmeter is the difference frequency of two voltage controlled variable frequency oscillators VFO1 and VFO2 whose frequencies are made to be exactly $N \times (1/t_1)$ and $N \times (1/t_2)$ by control circuits comparing $t_1$ with $Nt_{VFO1}$ and also $t_2$ with $Nt_{VFO2}$.

$t_{VFO1}, t_{VFO2}$ are the time periods of the two controlled oscillators.

The output frequency is proportional to the fluid velocity.

$$f_d = f_{VFO1} - f_{VFO2} = \frac{N}{t_1} - \frac{N}{t_2} = \frac{2NV}{L}$$

For similar water velocity and transducer spacing this method results in an output frequency proportional to water velocity N times that of the method described in British Specification No. 1,285,175 so that a readout can be made in the 1/N th the time. N can be any convenient number, say 100 or 1000.

In the arrangement of FIG. 1, the transducers are not made to sing-around, the transmitter is not retriggered by a received pulse, but by a pulse from a clock pulse generator in the form of master oscillator 11 whose period of oscillation is greater than $t_1$ or $t_2$.

The velocity resolution of this flowmeter is, in the limit, determined by the smallest time difference that can be resolved between $t_1$ and $Nt_{VFO1}$ or between $t_2$ and $Nt_{VFO2}$.

Ultrasonic electromechanical transducers 1 and 2 are arranged spaced apart so as to transmit pressure wave pulses through the fluid along the direction in which velocity component is to be measured.

It is convenient to describe the operation of the arrangement of FIG. 1 for one transmission direction, the opposite direction being similar.

The master oscillator 11 provides a train of "start" pulses whose period is conveniently some 10 or 20% longer than L/C,
where
L is the distance between transducers 1 and 2
C is the velocity of sound in the fluid.

Each "start" pulse enables a trigger pulse to transducer 1 via drive circuit TX1 as soon as the next pulse occurs from oscillator VFO1 after this start pulse. The resultant pulse of ultrasound from transducer 1 travels through the liquid to transducer 2.

A logic 1 circuit compares the time of arrival of the received pulse from transducer 2 via amplifier RX1 with the time that the Nth pulse from oscillator VFO1 occurs. Depending on whether the received pulse occurs before or after the Nth VFO1 pulse, a control 1 circuit is caused to make a small change in the control voltage to oscillator VFO1 to increase or decrease its frequency respectively. After a number of transmissions the Nth VFO1 pulse will be in time coincidence with the received pulse, so that $$f_{VFO1} = N \times \frac{1}{t_1} \left( t_1 = \frac{L}{C-V} \right)$$

where
$t_1$ is the time taken for the ultrasonic pulse to travel between the transducers.

Similarly transmissions are made in the opposite direction from transducer 2 to transducer 1 to obtain a VFO2 frequency of $$f_{VFO2} = N \times \frac{1}{t_2} \left( t_2 = \frac{L}{C+V} \right)$$

The components for this operation are referenced similarly to the corresponding components described above, but using suffix 2 instead of suffix 1.

A difference frequency circuit 12 provides an output whose frequency is proportional to the velocity of the fluid between the transducers.

$$f_{VFO1} - f_{VFO2} = \frac{2NV}{L}$$

A strobe 13 generates a pulse following each start pulse after a fixed time delay set by delay 14. The strobe period is arranged to embrace the expected time of arrival of a received pulse. If no received pulse arrives in this strobe time due to an obstruction in the fluid path this is recognised by the logic circuitry and no change in the VFO control voltage is made. Temporary obstruction affecting only a few transmissions can be permitted. Permanent obstruction is recognised as a fault condition and the readout inhibited.

Figure 3:
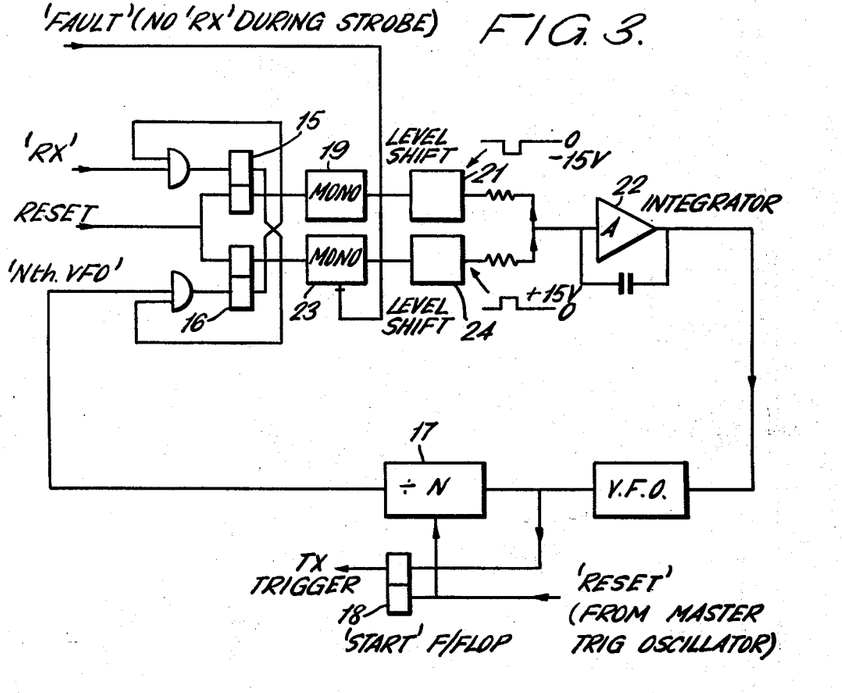
FIG. 3 is a block diagram illustrating in greater detail part of the construction of FIG. 1.
Figure 4:
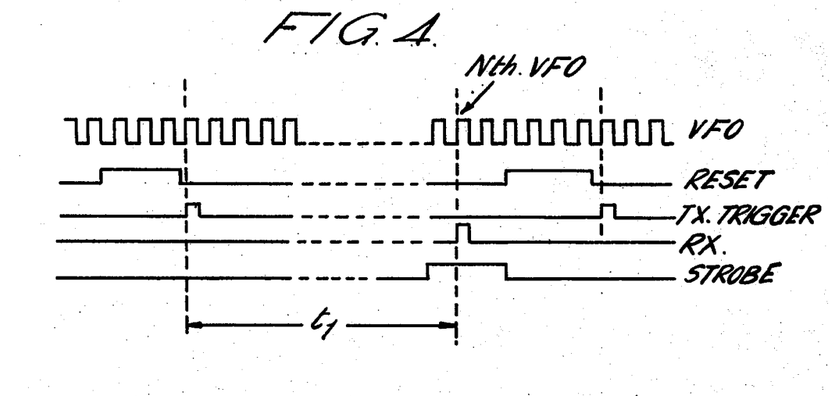
FIG. 4 shows various waveforms for illustrating the relative timing of various operations.

FIG. 3 shows some parts of FIG. 1 in greater detail. Again operation is considered in one transmission direction only. The VFO frequency is required to be exactly $N \times 1/t_1$, where $t_1$ is the time taken for the pulse of ultrasound to travel from the transmitting transducer to the receiving transducer.

The transmitting transducer is triggered in time coincidence with a VFO pulse and a comparison is made between the time to the Nth VFO pulse and the time taken before a pulse is received at the receiving transducer. Any difference between these times produces an error voltage which controls the VFO frequency. After a sufficient number of transmissions a time coincidence between the Nth VFO and the received pulse is achieved, i.e., $f_{VFO}$ is exactly equal to $N \times 1/t_1$.

Referring to FIG. 3, the operation is as follows.

A start pulse (which appears at both points marked RESET in FIG. 3) from the master oscillator 11 resets flip-flops 15 and 16, resets the $\div N$ counter 17 and resets the start flip-flop 18.

At the end of the reset pulse the $\div N$ counter 17 starts counting.

When a next VFO pulse ($n = 1$) is fed to the $\div N$ counter 17, the start flip-flop 18 is set, and its output triggers the transmitter drive TX, i.e., the transmitter transducer is triggered in time coincidence with a VFO pulse.

Either the Nth VFO pulse (output from $\div N$ counter) can set flip-flop 16 or the received pulse RX can set the flip-flop 15, depending on which occurs first. The first flip-flop set, inhibits the other.

Depending on whether flip-flop 16 or flip-flop 15 operates, then the VFO requires a control voltage increment to reduce or increase its frequency respectively.

If the flip-flop 15 operates, this will trigger a monostable 19 which will turn on, via a level shift circuit 21, an input current to an integrator 22, which will alter its output by one small positive increment. This change in VFO control voltage will slightly increase the VFO frequency.

If, on the other hand, the flip-flop 16 operates, then its monostable 23 provides, via a level shift circuit 24, an input current of opposite polarity so as to alter the integrator output by a small negative increment, to decrease the VFO frequency.

After a number of transmissions the VFO frequency is adjusted very close to $N \times 1/t_1$ and successive transmissions produce errors of opposite polarity so that the VFO frequency is alternately adjusted slightly lower and higher than $N \times 1/t_1$.

The integrator 22 is set to give a sufficiently small increment, when triggered by level shift circuit 21 or level shift circuit 24, to achieve the best resolution compatible with the required response time and the other sources of error in the system. However, such small increments may lead to a long delay in achieving coincidence on initial setting up, if there is initially a wide divergence between the times of arrival of the received RX pulse and the "Nth VFO" pulse. The integrator 22 is therefore provided, in this example, with a manually operable control 30 for increasing the magnitude of the increments so that an approximate coincidence may be achieved rapidly.

The smallest time difference that can be resolved between received RX and "Nth VFO" pulses is about 6 nanoseconds and this gives a velocity resolution better than that required for most applications.

The velocity resolution actually achieved is always better than indicated from consideration of the time resolving ability of the circuit. Even with still fluids or very constant flow velocites there are always variations in transmission times of the ultrasound about the mean time. Although these time variations result in a larger swing of VFO frequency about the true means than the alternate positive and negative errors described above, the average VFO frequency is closer to this mean.

Figure 5:
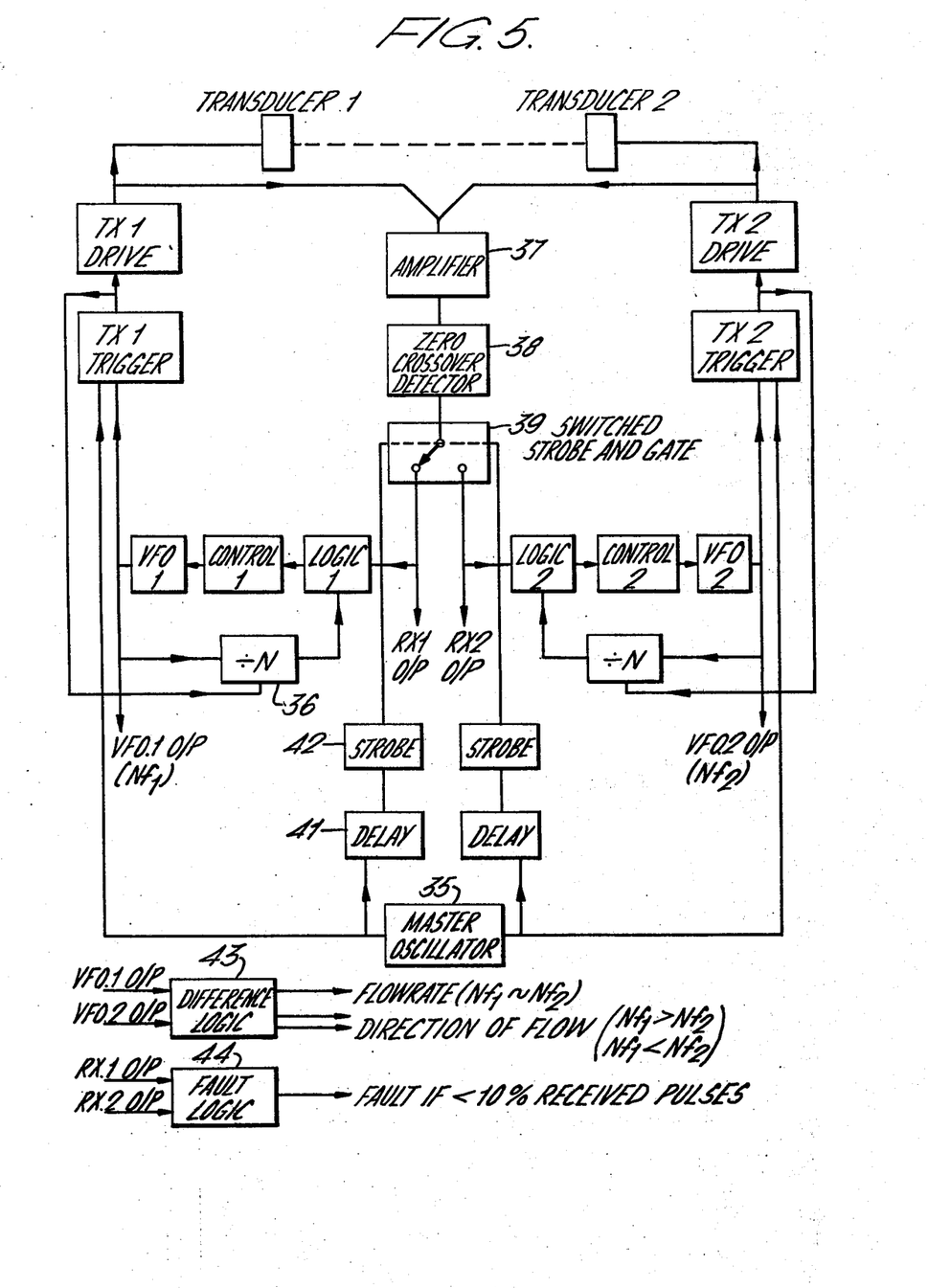
FIG. 5 is a block diagram of a modification of the FIG. 1 construction.

If there is an obstruction between the transducers and no received RX pulse is received there is no correction made to the VFO frequency. This obstruction is recognised by logic circuitry (not shown in FIG. 3) which inhibits the operation of the monostable 23. The integrator has a long decay time constant so that a small number of obstructed transmissions produce a negligible error. Obstruction for more than a few transmissions is recognised by a "fault" circuit. The "fault" circuit comprises a ratemeter 44 into which are fed the received RX1 and received RX2 pulses, as illustrated in FIG. 5. The ratemeter is calibrated to provide a fault signal if the number of received pulses is less than 10 per cent of the maximum possible number of received pulses assuming no obstructions. The fault signal output may be used to light a warning lamp (not shown) and/or inhibit further velocity read-out until the rate of received pulse is restored to greater than 10 per cent of the maximum.

Figure 6:
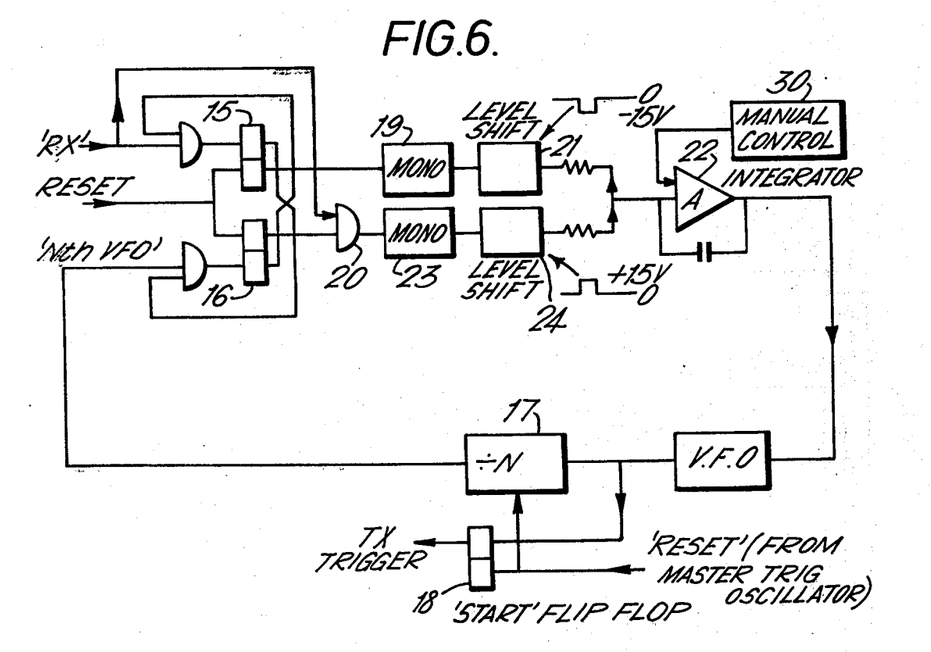
FIG. 6 is a block diagram illustrating a modification of FIG. 3.

FIG. 6 illustrates a modification of the FIG. 3 arrangement to provide in an elegantly simple way for inhibition of the correction to VFO frequency in the event that the pressure wave pulse is obstructed. The operation of the FIG. 6 arrangement is the same as FIG. 3 except that, if the Nth VFO pulse arrives before the RX pulse, flip-flop 16 operates but its output is applied to AND gate 20 instead of direct to monostable 23. The output of AND gate 20 is connected to monostable 23, whilst its other input is connected to receive the received pulse RX. Consequently, although the arrival of the Nth VFO pulse has occurred before the received pulse RX and the flip-flop 16 is set, the monostable 23 does not operate until the received pulse RX arrives. If no received pulse RX arrives during the strobe period, for example owing to obstruction, then monostable 23 simply does not operate and no adjustment is made to the VFO frequency.

Figure 2:
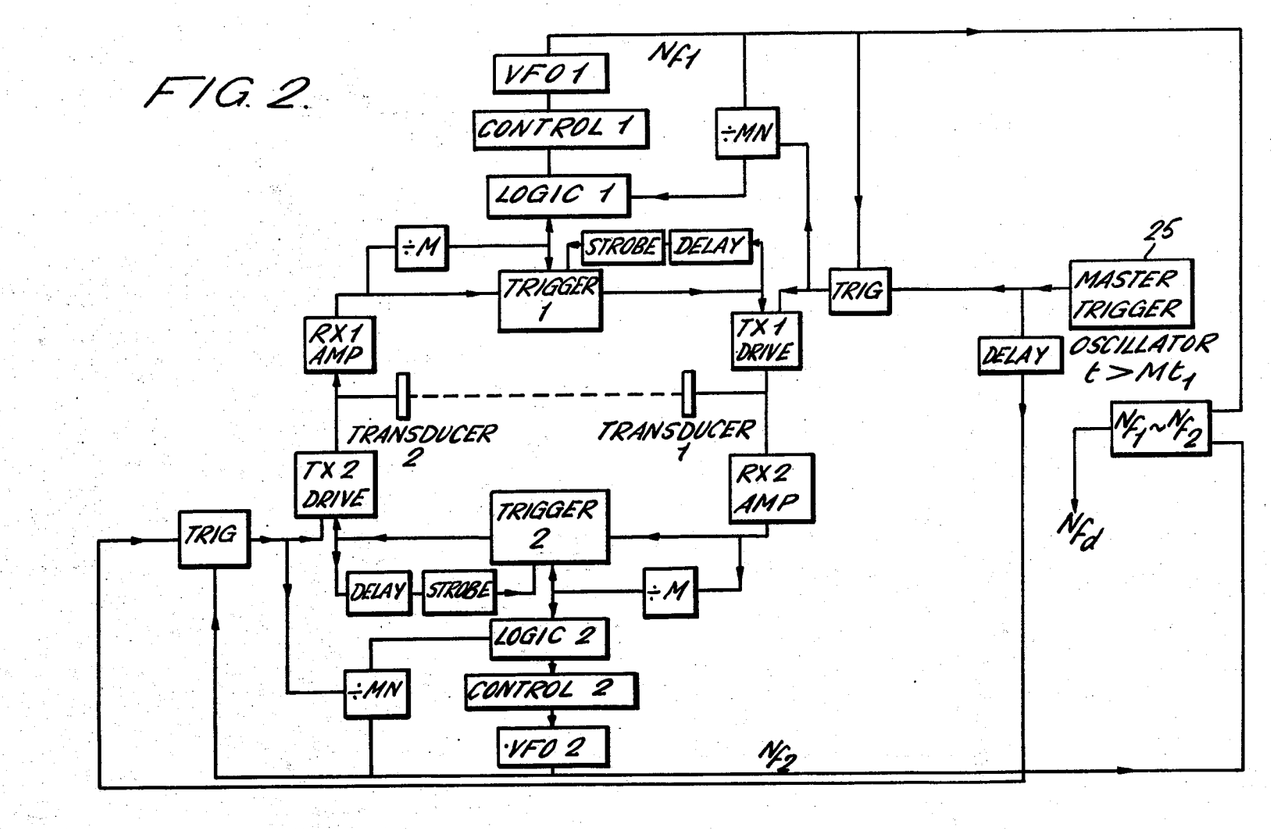
FIG. 2 is a block diagram illustrating another construction.

FIG. 2 illustrates an alternative arrangement in which velocity resolution is improved at the expense of response time. In this method two voltage controlled variable frequency oscillators VFO1 and VFO2 are again used with their frequencies controlled to be $N \times 1/t_1$ and $N \times 1/t_2$, but with the control voltage obtained by a comparsion between $Mt_1$ and $MNt_{VFO1}$ and between $Mt_2$ and $MNt_{VFO2}$. M is the number of times each channel is allowed to sing-around after each master oscillator clock pulse. The period of this oscillator has to be greater than $Mt_1$ or $Mt_2$. In this way the velocity resolution is improved by a factor M over the system (as in FIG. 1) using multiplying VFO's without sing-around. By appropriate choice of M, a satisfactory compromise between velocity resolution and response time can readily be set up for any chosen measurement.

As with FIG. 1 it is convenient to describe operation for one transmission direction, the opposite direction being similar.

A clock pulse generator in the form of master oscillator 25 provides a train of pulses whose period is greater than ML/C.

Each start pulse from the master oscillator 25 enables a transmitter drive circuit TX1 to provide a drive pulse to transducer 1 as soon as the next VFO1 pulse occurs after this start pulse.

The resultant pulse of ultrasound travels through the fluid from transducer 1 to transducer 2. The received pulse at amplifier RX1 output immediately triggers the drive TX1 to produce another drive pulse to transducer 1; i.e., the system now "sings-around". The Mth received pulse at amplifier RX1 does not retrigger the drive TX1 so that only M sing-arounds occur. In this example, M is chosen so that there are not so many sing-arounds as to introduce any likelihood of coincidence between transmission and reception at either transducer.

Logic 1 circuit compares the time of arrival of the Mth received pulse with the time that the M × Nth VFO1 pulse after the start pulse occurs; i.e., a comparison is made between $Mt_1$ and $MNt_{VFO1}$.

Depending on whether the received pulse occurs before or after MNth pulse, a small change in voltage is made by control 1 circuit to increase or decrease VFO1 frequency respectively.

After a number of these periods of singing-around the MNth VFO1 pulse will be in time coincidence with the Mth pulse from amplifier RX1 so that, as with the previous method $$f_{VFO1} = N \times \frac{1}{t_1} \left( t_1 = \frac{L}{C-V} \right)$$

Similarly, transmissions are made in the opposite direction from transducer 2 to transducer 1 to obtain $$f_{VFO2} = N \times \frac{1}{t_2} \left( t_2 = \frac{L}{C+V} \right)$$

The flow meter output, porportional to water velocity, is the difference frequency of the two VFO's.

$$f_D = f_{VFO1} - f_{VFO2} = \frac{N}{t_1} - \frac{N}{t_2} = \frac{2NV}{L}$$

It will be seen that the circuitry of FIGS. 1 and 3 is readily adapted for this limited sing-around method. Operation is similar except that after each master oscillator trigger pulse a counter must divide by MN, and the flip-flops operate on the MNth VFO pulse and the Mth received RX pulse.

For a given error in VFO frequency the time difference of the inputs to the flip-flops is thus M times as great, which provides an effective time comparsion between $t_1$ and $Nt_{VFO1}$ which is 1/Mth that possible without limited sing-around. Thus one achieves an increase of M in flow velocity resolution.

Each trigger output to the drive circuit TX also generates a strobe pulse, which is delayed so that a received pulse arrives within this strobe time. The trigger is inhibited except during the strobe pulse, to avoid, so far as possible re-triggering by spurious signals. If no pulse is received during the strobe pulse because of obstruction in the fluid path between the transducers, then this is recognised as a fault condition. For each fault condition a trigger pulse is generated for the drive circuit TX to keep the sing-around going, but no change is made to the VFO control voltage at the completion of M transits.

Temporary obstruction affecting only a few limited sing-around periods can be permitted. Longer obstruction is recognised and the read-out inhibited.

Since the transducers do not receive pulses simultaneously, it is possible to employ a single amplifier to replace amplifiers RX1 AMP and RX2 AMP in FIG. 1. An appropriate rearrangement of the circuitry is shown in FIG. 5, which shows some additional improvements.

Referring to FIG. 5, a clock pulse generator in the form of master oscillator 35 provides a train of pulses whose period is greater than L/C to each of the triggers TX1 and TX2, the pulses to trigger TX2 being displaced in time relative to the pulses to trigger TX1 to avoid clash of receive and transmit pulses at the transducers.

In practice, the transducers are driven very hard to provide the maximum amplitude pressure wave pulse. Consequently the transducers take some time to settle down after transmission before they can be ready to receive. This is also taken into account in selecting the delay between pulses to trigger TX2 and pulses to the trigger TX1. The delay can be sufficiently small for the oppositely travelling pressure wave pulses to be in flight through the fluid at the same time, but only if the path length is long enough — that is corresponding to a pipe of several feet in diameter. With, for example, a pipe of 6 inch diameter near simultaneous flight would imply of the order of 80 to 90 microseconds for the transducer to settle down after it had been driven. This is not practicable so that, in small diameter pipelines, a slight separation in flight times of the oppositely directed pressure wave pulses has to be accepted.

A pulse from the master oscillator 35 enables TX1 trigger, which triggers the drive circuit TX1 upon the next VFO1 pulse. The output from trigger TX1 also resets the ÷ N counter 36 to $n = 1$.

The resultant pulse of ultrasound travels through the fluid from transducer 1 to transducer 2. The received pulse is routed to amplifier 37.

An accurate time reference is established upon this received pulse by a zero-crossover detector 38.

The output from the zero-crossover detector 38 is fed via a switched strobe and gate 39 to logic 1 circuit and control 1 circuit which correspond in operation to the components similarly referenced in FIG. 1. Thus the logic 1 circuit compares the time of arrival of the received pulse from transducer 2 with the time that the Nth pulse from oscillator VFO1 occurs. to received pulse occurs before or after the Nth pulse Depending upon whether the received pulse occurs before or after the Nth VFO1 pulse, the control 1 circuit is caused to make a small change in the control voltage to oscillator VFO1 to increase or decrease its frequency respectively. After a number of transmissions the Nth VFO1 pulse will be in time coincidence with the received pulse. If no "receive" pulse arrives in the strobe time due to an obstruction in the fluid path, this is recognized by the logic circuit and no change in the VFO control voltage is made, in a similar manner to that already described in relation to FIG. 1.

The signal from the master oscillator 35 also controls the switched strobe and gate 39, via delay 41 and strobe 42. The delayed strobe signal serves both to inhibit response except around the expected time of arrival of a received pulse and to operate the switch to route the received signal to logic 1 circuit.

Operation for transmission from transducer 2, parallels that for transducer 1, except that the received signal from transducer 1 is routed, via the strobed switch and gate 39 to logic 2 circuit.

The outputs labelled VFO1 O/P, representing $Nf_1$, and VFO2 O/P, representing $Nf_2$ are fed to difference logic circuit 43. The flowrate is indicated by a difference output $(Nf_1 \sim Nf_2)$. In this example, flow direction is indicated by logic outputs showing whether $Nf_1 > Nf_2$ or $Nf_1 < Nf_2$.

As with the FIG. 1 arrangement, the integrator has a sufficient time constant for it not to matter if some pulses are obstructed. The received pulses are monitored from amplifier 37 and, indicated as RX1 O/P and RX2 O/P, are fed to a fault logic circuit 44. This circuit indicates a fault and inhibits readout if less than a preset minimum percentage of pulses is received. Typically, it has been found satisfactory to set the fault circuit to operate if less than 10% of the transmitted pulses from either transducer is received. In practice, it is usual to find that either all pulses are received or some obstruction is present when none are received. A temporary obstruction, such as a passing boat where river flow is being monitored, may interrupt several pulses, but will not generally affect the reading.

It will be appreciated that the FIG. 2 arrangement may be modified to employ a single amplifier in a manner similar to that shown in FIG. 5.

Figure 7:
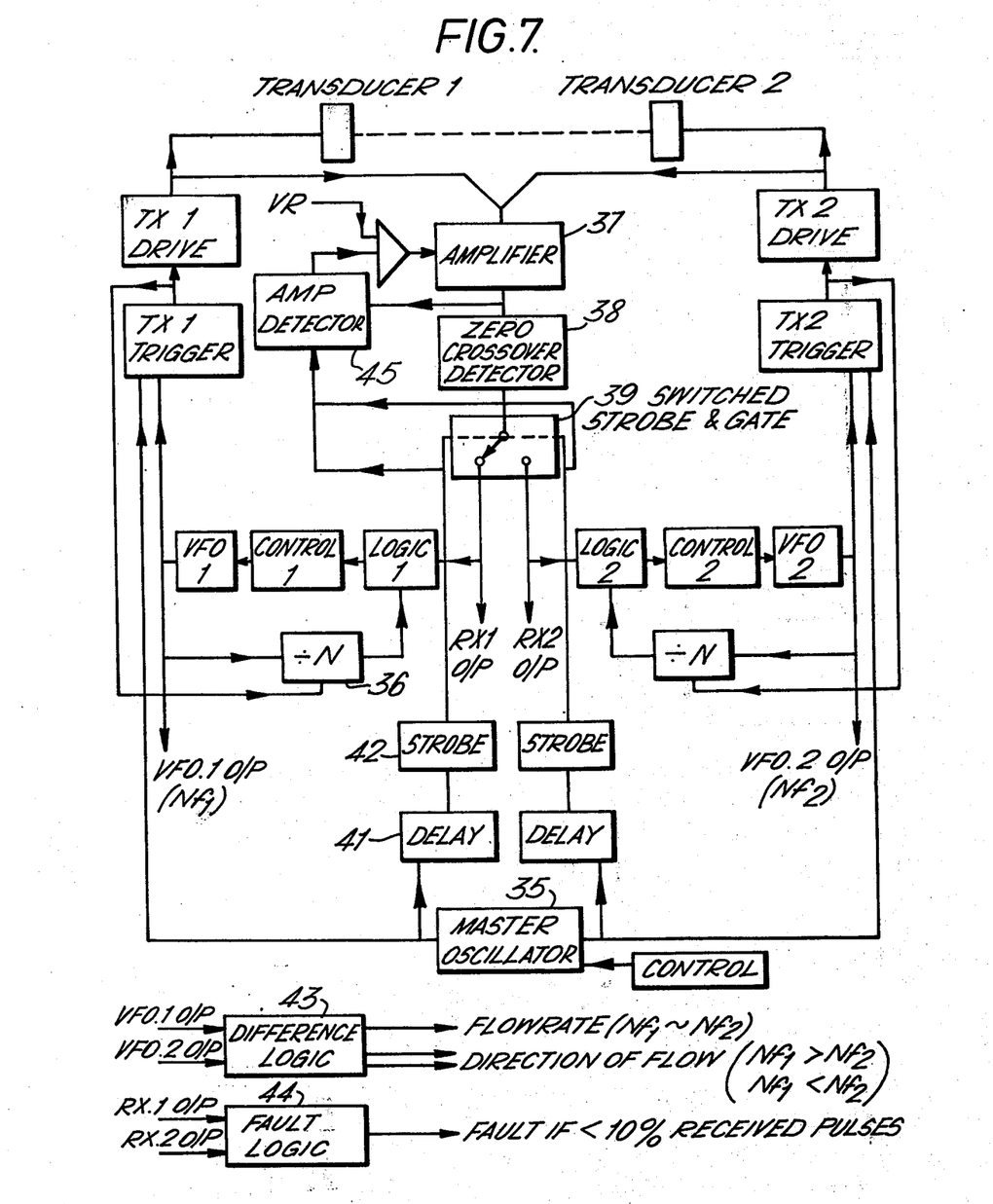
FIG. 7 is a block diagram showing a development of the FIG. 5 construction.
Figure 8:
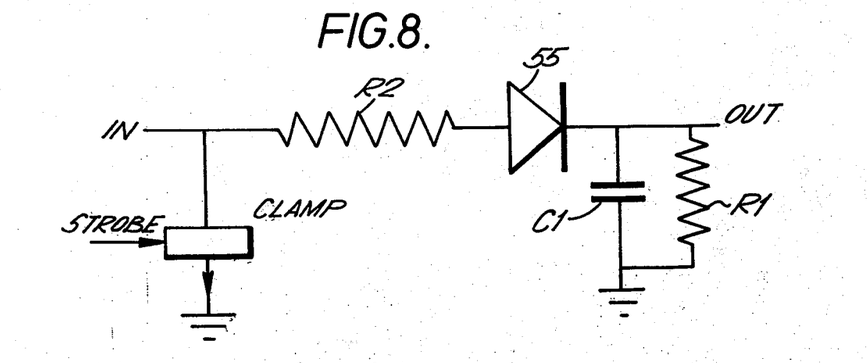
FIG. 8 is a circuit diagram of one component of FIG. 7.

FIGS. 7 and 8 show a development of FIG. 5 in which the use of a zero-crossover detector for establishing a time reference on the received pulse is coupled with an automatic gain control operating on the amplifier 37. The automatic gain control comprises an amplitude detector 45, the output from which is compared with a reference voltage VR by operational amplifier 46. The voltage output from operational amplifier 46 controls the gain of amplifier 37 so as to tend to maintain constant the amplitude of the output pulses from the amplifier 37. The voltage VR may be adjustable if desired to adjust the setting of desired amplitude. The amplitude detector 45 includes a clamp circuit under control of the strobes 42 so that the amplitude detector 45 is only operative during the strobe period.

FIG. 8 shows the amplitude detector 45 in greater detail. This circuit is designed to meet the specific characteristics of typical received pulses which comprise 4 or 5 high frequency oscillations of initially increasing and then decreasing amplitude. Thus, the diode 55 rectifies the input signal and this is averaged by the capacitor resistance circuit C1 and R1. The inclusion of series resistor R2 introduces an integrating function so that the output is not dominated by any isolated large amplitude swings in the received pulse. The strobe controlled clamp comprises a transistor which shorts out the amplitude detector except when a strobe signal is present, when the transistor is biassed to its high impedance condition.

The output of the apparatus of all the foregoing examples is a frequency, equal to the difference frequency of the two VFO's, proportional to the fluid flow velocity component between the transducers.

At low flow rates (around 1 cm/sec or less) the fractional shift in frequency of each VFO is of the order of $1/10^6$. The small difference frequency between the two VFO's is best measured digitally.

Figure 9:
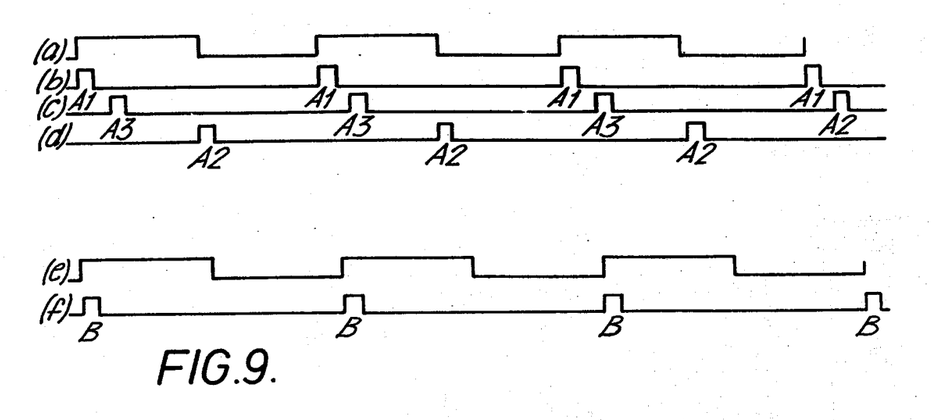

FIGS. 9 and 10 illustrate how this is done in the examples embodying the present invention.

FIG. 9 (a) represents the pulses of variable frequency oscillator VFO1 and FIG. 9 (e) represents the pulses of variable frequency oscillator VFO2. Apparatus, not shown, generates a series of pulses based on leading and trailing edges of the VFO pulses. The pulses of these series are of short duration compared with the VFO pulses, typically 1/10th of the VFO pulse duration, and are as follows:

Pulses A1 (FIG. 9 (b) are generated from the leading edge of the VFO1 pulses.

Pulses A2 (FIG. 9 (d) are generated from the trailing edge of the VFO1 pulses.

Pulses A3 (FIG. 9 (c) are generated from the leading edge of the VFO1 pulses with a preset delay.

Pulses B (FIG. 9 (f) are generated from the leading edge of VFO2 pulses.

Unless there is zero fluid flow the two frequencies of VFO1 and VFO2 will not be equal and their phase relationship will change continually. Provided the frequency difference is small (which is in practice always the case) there will be one coincidence between pulses B and A1 and one coincidence between B and A2 for each complete 360° shift in phase between the two VFO pulses.

Detection of these coincidences is a known technique for providing a difference frequency and the upper part of FIG. 10 illustrates the necessary logic circuitry. Thus AND gate 61 provides an output to reset flip-flop 62 when there is a coincidence between pulses B and A2, whilst AND gate 63 provides an output to set the flip-flop 62 when there is a coincidence between pulses B and A1. The output on line 64 from the flip-flop 62 is thus at the difference frequency.

As described thus far the difference frequency circuitry of FIG. 10 is known and has the following disadvantages:

1. There is no information as to which of the two frequencies VFO1 or VFO2 is the larger - that is there is no indication of the flow direction.

2. At low or zero fluid flow there is a scatter in the instantaneous VFO frequencies owing to a small scatter in the time of flight of the pulses of ultrasound across the pipe and also owing to the limit in time resolution of VFO multiplier circuits used to compare the timing of the received pulse with the Nth VFO pulse.

Accordingly, as a novel feature of the embodiments of the present invention, we have provided a "sign" indicating circuit which can tag each difference frequency output pulse with a direction. We provide further for a display which is numerically easy to interpret and easy to set to give a flow measurement in any required units.

Thus, pulses A3 (FIG. 9 (c)) have a duration similar to pulse A1, A2 and B but are delayed behind pulses A1 by a time $t$ greater than the duration of pulses A1 or B.

When the two VFO frequencies are not equal, there will be a coincidence between pulses B and A1 and B and A3 for each 360° phase shift between the VFO1 and VFO2 pulses.

Coincidences between B and A3 are detected by AND gate 65 which provides an output to reset flip-flop 66. Flip-flop 66 is set by an output from AND gate 63 when pulses B and A1 coincide.

If the frequency of VFO1 is greater than that of VFO2, then, when flip-flop 62 resets to give the difference frequency output pulse, the "sing" flip-flop 66 will be in the re-set condition since the last sign coincidence will have been between pulses B and A3.

The difference frequency output pulses on line 64 are counted by an up/down counter 67 controlled to count up when flip-flop 66 is "positive" — that is in its set condition - and to count down when flip-flop 66 is "negative" — that is in its reset condition. Thus, at the end of a timed counting period the output of the up/down counter will be a true net value of the "up" and "down" pulses. By appropriate choice (within reasonable limits) of the timing period the count at the end can be read directly in whatever units of measurement are required.

A normal up-down counter counting down from a positive number through zero, will count all negative numbers as a complement. For example the count might read successively: 0003, 0002, 0001, 0000, 9999, 9998, 9997, etc.

To avoid this confusing display of complementary numbers the sign tagging of the input pulses is reversed as necessary to keep the counter adding in the up direction. This is done with a circuit (not shown) which detects a change to a negative 1 count (e.g., detects 9999 in a 4 decade counter) immediately resets the counter, adds 1 up count, changes the polarity of the tagging and lights a −ve sign indicator. When the counter next counts down to negative 1, the circuit again operates, this time returning the counter and sign tagging circuit to normal. The −ve sign indicator is then extinguished and, if desired a +ve may be illuminated.

Figure 11:
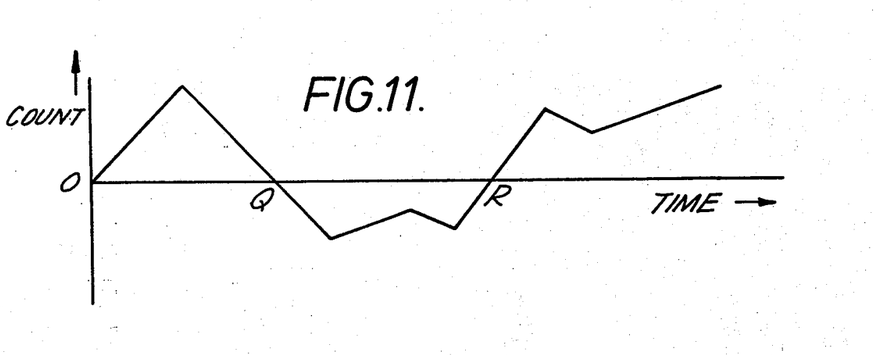
FIGS. 11 and 12 are graphs for illustrating the operation of the part shown in FIG. 10.
Figure 12:
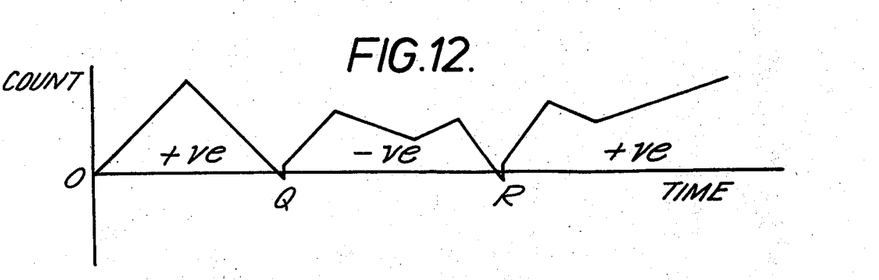

This operation is illustrated in FIGS. 11 and 12 in which FIG. 11 shows the operation of a normal up/down counter going into complementary numbers between points Q and R on the time axis. FIG. 12 shows the corresponding operation of an up/down counter controlled in the manner described above. The counter counts up between Q and R on normal down counts and counts down on normal up counts.

The apparatus of the foregoing examples is particularly advantageous for measuring total flow in rivers or large pipes, where the transducers are spaced apart across the whole width of the river or pipe, on an inclined path so as to introduce a velocity component along the path. With such large base lines, the response time of systems such as described in British Pat. Specification No. 1,285,175 is unacceptably slow.

However, the apparatus of the foregoing examples is also advantageous for flow measurement in small pipelines. Transducers can be mounted on the outside of the pipeline, thus introducing no disturbance to the flow. The transducers are located axially displaced and so angled and coupled to the pipeline that, taking refractions at the various interfaces into account, an appropriate path, as steeply inclined to the radial direction as possible, is followed by the ultrasonic pulses in the flowing fluid. A flow of about 1 cm/sec in a pipe of about 10 cms diameter would require of the order of minutes response time using a sing-around system and coincidence counting. With the apparatus of the foregoing examples, this response time can be cut readily to a fraction of a second.

The provision of zero-crossover detection to provide a time reference upon the received pulses is a feature enabling improved resolution to be achieved and avoids variation of the time reference with variation in amplitude of received pulse. This has been found to be an important advantage where it is desired to measure the flow velocity of fluids, such as liquid slurries, with a high solids content. For such measurements, there may be wide and rapidly changing variation in attenuation of the ultrasonic signal in the liquid with consequent wide variation in amplitude of the received pulse. This can readily be compensated, in the apparatus of the examples, by provision of an automatic gain control on the received pulse amplifier. It is to be appreciated, however, that simple amplitude control of this type applied to the receiver amplifier is possible only because the time reference of the pulse is rendered independent of amplitude by use of the zero-crossover detector.

The invention is not restricted to the details of the foregoing example. For instance, it is preferred to use two variable frequency oscillators and associated control circuits so that the measurements in the opposed directions can proceed in parallel, the only requirement being a sufficient difference in timing between individual pulses to avoid coincidence in transmission and reception at any one transducer, with consequent receiver paralysis. The advantages of this mode of measurement are principally:

1. The measuring ultrasonic pulses are in flight across the fluid path very nearly simultaneously, thus minimising any possible effects upon the transit velocity measurement due to temperature, density or other variations in the fluid, and 2. It is straightforward to indicate a difference frequency between two simultaneously operating oscillators and the output is a continuous indication of flow velocity. Although flow velocity changes are not followed instantaneously, they are followed quite rapidly, particularly with the FIG. 1, FIG. 5 or FIG. 7 embodiment.

However, if desired, it would be possible to employ a single voltage controlled oscillator and associated control circuitry and carry out successive determinations of, initially, the frequency required to fit N pulses into the time period taken for pressure waves to travel from the transducer 1 to transducer 2 and, subsequently, the frequency required to fit N pulses into the time period taken for pressure waves to travel from transducer 2 to transducer 1. Such a system would require a store to hold the first frequency whilst the second frequency is being determined, after which the difference frequency can be found by subtraction.

Further, it is clearly most convenient to arrange for the number N of variable frequency oscillator pulses to be the same within each time period, so that the difference frequency has a simple proportionality to the flow velocity. However, one could use a different number of pulses, say $N_1$ pulses for the upstream measurement and $N_2$ pulses for the downstream measurement. It would then simply be necessary to adjust the difference output by a constant factor in calculating the flow velocity.

The transducers need not necessarily be on opposite sides of the pipeline but may be mounted on the same side. The transducers would then be so angled and coupled to the pipeline that the ultrasonic pulses in the fluid travel from one transducer to the other by reflection from the opposite side wall of the pipeline. This arrangement has advantages for small diameter pipelines in that the path length through the fluid is increased and the transducers may be ready mounted on an external support which is simply clamped onto the side of the pipeline for operation.

We claim:

1. Apparatus for use in measuring the velocity or a component of velocity of fluid flow, which apparatus comprises first and second units spaced apart and each adapted to transmit and receive pressure wave pulses travelling over a path through the fluid in the direction in which velocity component is to be measured, variable frequency oscillator means, timing control means for defining time intervals of duration independent of the frequency of the variable frequency oscillator means, trigger means under control of the said timing control means for causing a pressure wave pulse to be transmitted from the first unit to the second unit and, separately, from the second unit to the first unit, and control means for adjusting the variable frequency oscillator means to generate a first frequency dependent upon the time taken for a pressure wave pulse to travel from the first unit to the second unit and, separately under control of said timing control means, to generate a second frequency dependent upon the time taken for a pressure wave pulse to travel from the second unit to the first unit, and a difference determining means for determining the difference between said first and second frequenices.

2. Apparatus as claimed in claim 1, wherein the variable frequency oscillator means is controlled by the said control means to generate a number $N_1$ of oscillations or pulses in a first time period being that taken for a pressure wave pulse to travel from the first unit to the second unit and a number $N_2$ of oscillations or pulses in a second time period being that taken for a pressure wave pulse to travel from the second unit to the first unit, said control means comprising logic circuitry for comparing the times of occurrence of the $N_1$th oscillation or pulse with the time of arrival of the pressure wave pulse at the second unit and for comparing the time of occurrence of the $N_2$th oscillation or pulse and the time of arrival of the pressure wave pulse at the first unit, the said oscillation or pulse repetition frequency being adjusted to tend to bring the said times of occurrence of the $N_1$th or $N_2$th oscillation or pulse into coincidence with the time of arrival of the respective pressure wave pulse, the said difference determining means indicating the difference in frequency between the oscillations or pulses generated in the first time period and the oscillations or pulses generated in the second time period.

3. Apparatus as claimed in claim 2, wherein inhibitor means are provided for inhibiting adjustment of the oscillation or pulse repetition frequency in the event that no pressure wave pulse is received within a predetermined period embracing its expected time of arrival.

4. Apparatus as claimed in claim 2, wherein $N_1 = N_2 = N$.

5. Apparatus as claimed in claim 1, wherein said trigger means comprises first and second trigger devices, and first trigger control means are provided for causing said frist trigger device to re-trigger the first unit upon reception of a pulse by the second unit, and for inhibiting said first trigger device from further re-triggering when a predetermined number $M_1$ of pulses has been transmitted from the first unit to the second unit, second trigger control means are provided for causing said second trigger device to re-trigger the second unit upon reception of a pulse by the first unit, and for inhibiting said second trigger device from further re-triggering when a predetermined number $M_2$ of pulses has been transmitted from the second unit to the first unit, the timing control means being set to initiate pulse transmission from the second unit to the first unit only after sufficient time has elapsed for completion of $M_1$ sing around transmissions from the first unit to the second unit and to initiate pulse transmission from the first unit to the second unit only after sufficient time has elapsed for completion of $M_2$ sing around transmissions from the second unit to the first unit, and the variable frequency oscillator means is controlled to generate a first frequency dependent upon the time taken for $M_1$ sing around transmissions of pressure wave pulses from the first unit to the second unit and a second frequency dependent upon the time taken for $M_2$ sing around transmissions of pressure wave pulses from the second unit to the first unit.

6. Apparatus as claimed in claim 5, wherein $M_1 = M_2 = M$.

7. Apparatus as claimed in claim 1, wherein said timing control means comprises a clock pulse generator, the frequency of which is fixed for a given set of measurement conditions.

8. Apparatus for use in measuring velocity or a component of velocity of fluid flow, which apparatus comprises first and second units spaced apart and each adapted to transmit and receive pressure wave pulses travelling over a path through the fluid in the direction in which velocity component is to be measured, first and second variable frequency oscillators, timing control means for defining time intervals of duration independent of the frequency of the variable frequency oscillators, means under control of the said timing control means for causing a pressure wave pulse to be transmitted from the first unit to the second unit and separately, from the second unit to the first unit, first control means for controlling the frequency of the first variable frequency oscillator to generate a first frequency dependent upon the time taken for a pressure wave pulse to travel from the first unit to the second unit, second control means for controlling the frequency of the second variable frequency oscillator to generate a second frequency dependent upon the time taken for a pressure wave pulse to travel from the second unit to the first unit, the first and second control means being controlled for operation in sequence by the timing control means, and a difference determining means for determining the difference between the said first and second frequencies.

9. Apparatus as claimed in claim 7, wherein the first variable frequency oscillator is controlled by the first control means to generate a number of $N_1$ of oscillations or pulses in a first time period being that taken for a pressure wave pulse to travel from the first unit to the second unit, the second variable frequency oscillator is controlled by the second control means to generate a number $N_2$ of oscillations or pulses in a second time period being that taken for a pressure wave pulse to travel from the second unit to the first unit, the said first and second control means each comprising logic circuitry for comparing the times of occurrence of the respective $N_1$th or $N_2$th oscillation or pulse with the time of arrival of the pressure wave pulse at the second unit or first unit respectively and frequency control means for adjusting the frequency of the respective variable frequency oscillator to tend to bring said time occurrence of the respective $N_1$th or $N_2$th pulse into coincidence with the time of arrival of the pressure wave pulse at the second unit or first unit respectively, the said difference determining means determining the difference in frequency between the oscillations or pulses generated in the first time period and the oscillations or pulses generated in the second time period.

10. Appparatus as claimed in claim 9, wherein inhibitor means are provided for inhibiting adjustment of the oscillation or pulse repetition frequency in the event that no pressure wave pulse is received within a predetermined period embracing its expected time of arrival.

11. Apparatus as claimed in claim 8, wherein $N_1 = N_2 = N$.

12. Apparatus as claimed in claim 9, wherein the said frequency control means comprises a first device operative when switched to increase the frequency of the associated variable frequency oscillator and a second device operative when switched to decrease the frequency of the associated variable frequency oscillator.

13. Apparatus as claimed in claim 12, wherein the logic circuitry provides an output for switching the said first device when the time of arrival of the pressure wave pulse is in advance of the time of occurrence of the respective $N_1$th or $N_2$th oscillation or pulse, the logic circuitry provides an output for switching the said second device when the time of occurrence of the respective $N_1$th or $N_2$th oscillation is in advance of the time of arrival of the pressure wave pulse and a said pressure wave pulse arrives within a time period embracing its expected time of arrival, and the logic circuitry provides no output if no pressure wave pulse arrives within the said time period embracing its expected time of arrival.

14. Apparatus as claimed in claim 13, wherein the said first device when switched increases the frequency of the associated variable frequency oscillator by a fixed increment and the said second device when switched decreases the frequency of the associated variable frequency oscillator by a fixed increment.

15. Apparatus as claimed in claim 14, wherein means is provided for adjusting temporarily the magnitude of the said fixed increments.

16. Apparatus as claimed in claim 9, wherein a time reference upon received pressure wave pulses is established by a zero-crossover detector.

17. Apparatus as claimed in claim 9, wherein sign detector means is provided for detecting which is the greater of the frequencies of the respective first and second variable frequency oscillators, and the oscillations or pulses of the difference frequency are counted by an up/down counter set to count respectively up or down by the sign detector means according to which of the said frequencies is the greater.

18. Apparatus as claimed in claim 17, wherein means is provided for reversing the setting of the up/down counter when it counts down below zero.

19. Apparatus as claimed in claim 18, wherein means is provided for displaying a negative symbol when the setting of the up/down counter is reversed.

20. Apparatus as claimed in claim 9, wherein said timing control means comprises a clock pulse generator, the frequency of which is fixed for a given set of measurement conditions.

21. Apparatus for measuring a component of velocity of a flowing fluid comprising:
   a. first and second transducer units spaced apart relative to the fluid flow and each adapted to transmit and receive pressure wave pulses through the fluid;
   b. first and second drive means connected, respectively, with said first and second transducers for causing, when energized, pressure wave pulses to be transmitted from the associated transducer to the other said transducer;
   c. a clock pulse generator which is set to generate oscillations or pulses at a preselected frequency such that the time interval between oscillations or pulses is of the same order but is greater than the expected time of flight of a pressure wave pulse between said transducers;
   d. first and second variable frequency oscillators connected in respective association with said first and second drive means;
   e. first and second control means associated, respectively, with said first and second variable frequency oscillators for controlling the frequency of the associated oscillator so that a number N of oscillations or pulses are generated in the time taken for a pressure wave to travel from the associated said transducer unit to the other said transducer unit, said control means comprising logic circuitry for comparing, for each direction of flight, the time of occurrence of the Nth oscillation or pulse with the time of arrival of the pressure wave pulse;
   f. first and second adjustment means associated, respectively, with said first and second variable frequency oscillators and responsive to said logic circuitry for adjusting the oscillation or pulse repetition frequencies of said variable frequency oscillators to tend to bring the time of occurrence of the Nth oscillations or pulses into coincidence with the time of arrival of the respective pressure wave pulse;
   g. first and second gate means associated, respectively, with said clock pulse generator and said first and second control means to energize the associated drive means only when the associated one of said gates has received both an oscillation signal or pulse from said clock pulse generator and a first next oscillation or pulse from the associated one of said variable frequency oscillators;
   h. first and second inhibit means connected respectively to the said first and second adjustment means for inhibiting adjustment of the frequency of said associated variable frequency oscillator in the event that no pressure wave pulse is received within a predetermined period embracing its expected time of arrival; and
   i. a difference determining means for determining the difference in frequency between the oscillations or pulses generated by said first and second variable frequency oscillators.

22. Apparatus according to claim 21, including delay means interposed between said clock pulse generator and one of said gate means to delay the reception of an oscillation or pulse from said clock pulse generator at that gate means.

23. Apparatus according to claim 22, wherein said delay means delays the reception of the clock pulse generator oscillations or pulses at said associated gate for a time period sufficiently short that the associated said transducer unit transmits a pressure pulse before it receives a previously transmitted pulse from the other said transducer unit.

24. Apparatus according to claim 21, including a zero-crossover detector connected to said transducer units for providing a time reference signal of the arrival of a received pressure pulse.

25. Apparatus according to claim 24, further including means which are governed by said clock pulse generator to selectively switch the output of said zero-crossover detector to either of said control means.

26. Apparatus according to claim 21, wherein an automatic gain controlled amplifier means is provided to amplify the input signal to said zero-crossover detector to a substantially constant level.

27. Apparatus according to claim 21, wherein said transducer units are spaced apart along a common boundary of the fluid flow.

28. Apparatus for use in measuring the velocity or a component of velocity of fluid flow, which apparatus comprises first and second units spaced apart and each adapted to transmit and receive pressure wave pulses travelling over a path through the fluid in the direction in which velocity component is to be measured, variable frequency oscillator means, trigger means for causing a pressure wave pulse to be transmitted from the first unit to the second unit and, separately, from the second unit to the first unit, and control means for adjusting the variable frequency oscillator means to generate a first frequency dependent upon the time taken for a pressure wave pulse to travel from the first unit to the second unit and to generate a second frequency dependent upon the time taken for a pressure wave pulse to travel from the second unit to the first unit, a difference determining means for determining the difference between said first and second frequencies, and inhibitor means for inhibiting adjustment of the oscillation or pulse repetition frequency in the event that no pressure wave pulse is received within a predetermined period embracing its expected time of arrival.

29. Apparatus as claimed in claim 28, wherein the variable frequency oscillator means is controlled by the said control means to generate a number $N_1$ of oscillations or pulses in a first time period being that taken for a pressure wave pulse to travel from the first unit to the second unit and a number $N_2$ of oscillations or pulses in a second time period being that taken for a pressure wave pulse to travel from the second unit to the first unit, said control means comprising logic circuitry for comparing the times of occurrence of the $N_1$th oscillation or pulse with the time of arrival of the pressure wave pulse at the second unit and for comparing the time of occurrence of the $N_2$th oscillation or pulse and the time of arrival of the pressure wave pulse at the first unit, the said oscillation or pulse repetition frequency being adjusted to tend to bring the said times of occurrence of the $N_1$th or $N_2$th oscillation or pulse into coincidence with the time of arrival of the respective pressure wave pulse, the said difference determining means indicating the difference in frequency between the oscillations or pulses generated in the first time period and the oscillations or pulses generated in the second time period.

* * * * *